Figure 1:
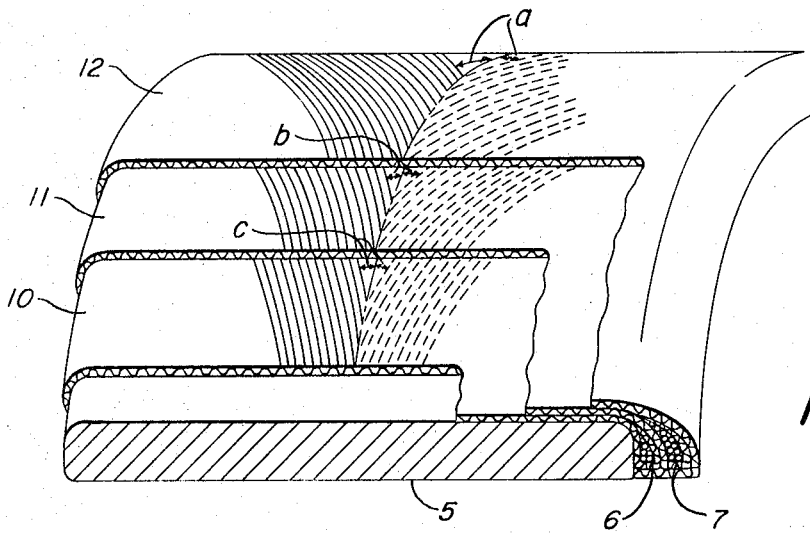

Jan. 24, 1967     T. R. WILLIAMS     3,300,352

METHOD OF BUILDING MULTIPLE-BEAD TIRES

Filed Aug. 31, 1965

INVENTOR.
THOMAS R. WILLIAMS
BY
ATTORNEY

United States Patent Office 3,300,352
Patented Jan. 24, 1967

3,300,352
METHOD OF BUILDING MULTIPLE-BEAD TIRES
Thomas R. Williams, 2415 Brice Road,
Akron, Ohio 44313
Filed Aug. 31, 1965, Ser. No. 486,596
2 Claims. (Cl. 156—133)

This application is a continuation-in-part of my application Serial No. 186,818 filed April 3, 1962 (now abandoned) and is also a continuation-in-part of my application Serial No. 810,150 filed April 30, 1959 (now abandoned).

This invention relates to the manufacture of multiple-bead tires.

Multiple-bead tires are used on trucks and busses and on off-the-road vehicles. It has been considered necessary to build such tires on undercut drums in order that the bead portions of the green tires made on the drum will approximate the shape they will have after curing. In other words, undercut drums have been used to minimize the amount the plies shift at the beads when the tire is expanded from its green shape to the shape in which it is cured.

If the cord angle in the plies of such tires is varied, with the cord angle of the innermost ply greater than the cord angle of the outermost ply, as will be explained herein, and as described and claimed in my application Serial No. 810,149, filed April 30, 1959 (now U.S. 3,057,-391), the cords in all the plies after the tire is expanded are under substantially the same stress or tension and it is therefore not necessary to build such tires on undercut drums.

A principal difficulty with the use of the undercut drum is that in stitching the plies together, it is necessary to apply lateral, horizontal and upward pressures, as well as downward pressure to the face of the drum. This difficulty is not encountered in the use of flat, low-profile drums such as are now used in the building of passenger tires in which the respective plies are extended radially inward over the edges of the drum instead of being brought inwardly as in an undercut drum, because only downward pressure is required for stitching the plies together on flat low-profile drums.

The use of a flat low-profile drum in the manufacture of multiple-bead tires differs from the traditional process used for reasons explained, but also the tire produced on such a flat low-profile drum is very different from the tire produced on an undercut drum. An important difference lies in the difference in the cord angles in adjacent plies or groups of plies. In passenger tires the cord angles in all of the plies are at the same angle, utilizing one bead core. It has been found advantageous to build passenger tires on flat low-profile drums because less labor is required than for tires built on undercut drums, as indicated above, and the time for building the tires on the flat low-profile drums is far less than required for building the same size tire on an undercut drum. It is known that the cord angles in the finished tires built on flat low-profile drums is very different from that of a tire of the same size built on an undercut drum. For instance, in a passenger tires of 6.70–15 (meaning a tire with a cross section of 6.70 inches and a bead diameter of 15 inches), the cord angles in the plies as laid up on a flat low-profile drum will be about 60°, and in the finished tire they will be about 38°; whereas the angles of the cords in the plies used for building a tire of this size on an undercut drum would be about 50°, and in the finished tire they would be about 38°. A cord angle of about 38° is associated with current good tire design, and if the manufacturer wants to make a single-bead tire (i.e. a single bead on each side of the tire), whether it be a passenger tire or a truck tire, he may well select a drum and plies with such a cord angle that in the finished tire the cord angle is about 38°. In order to obtain the 38° angle it is necessary to correlate the drum size and the type of drum with the angle of the cords in the plies.

At the present time multiple-bead tires such as are used on trucks, busses, etc. are made on undercut drums. Because of the number of plies and the fact that the bead-to-bead distance in the outer plies is greater than the bead-to-bead distance in the inner plies, the cord angles in the various plies of the finished tire differ, but average about 38° to the center line of the tire.

It has been recognized in the art that by varying the cord angles in the various plies of a multiple-bead tire the plies will be smooth, and not wrinkled when the tire is expanded from the drum to its final shape. However, it has not been suggested that it is possible to build a multiple-bead tire on a flat low-profile drum. The differences required in the cord angles of the various plies in order to produce a wrinkle-proof tire are so much greater than required for producing tires on undercut drums that a novel problem in tire design is presented and the solution of this problem has hitherto not been made known.

According to this invention, using plies with different cord angles, as will be explained, multiple-bead tires are made on such flat, low-profile drums and then expanded for curing. The cord angles shift as the tires are expanded so that in the final tires the cords in all of the plies are under substantially the same stress or tension, with the cord angles in the outer ply at least 10° greater than in the inner ply, with the average of the cord angles about 38°. The variance in the cord angles will be greater in tires with a large number of plies than in a tire of fewer plies. Thus, although there may be a difference of only 10° between the cord angles of the inner and outer plies of an 8-ply tire, in a tire of twelve or more plies the difference may be as much as 20° or more.

The invention lies in the method of constructing multiple-bead on such flat, low-profile drums.

The tires having the stabilized structure of this invention can be made from cotton, rayon, nylon or other synthetic fiber or wire cord fabric and regardless of the composition of the cord the fabric is referred to herein as cord fabric.

In constructing the tires of this invention, bias-cut cord fabric is employed and alternate or succeeding pairs of plies are reversed, as is well known in the art to obtain the desired criss-cross cord construction. The ends of the plies are locked around the bead cores in the usual manner and the tires may include breaker strips, chafing strips etc. as is well known in the art. For the sake of clarity of illustration such details of construction are not shown in the accompanying drawings.

The cord angles in the plies of the cured tire will vary depending upon the cord angles in the green tire on the drum as well as the extent to which the tire is expanded in being formed to its final or cured shape. By using plies having different cord angles as explained herein, a safer, stronger, more rigid and longer wearing tire is obtained in which the plies are not deformed during expansion, as by wrinkling, etc. at the beads or elsewhere, but all of the cords are under the same stress and share the load equally.

The invention will be described more particularly in connection with the construction of a multiple-bead tire in which the cord angles vary between the inner and outer plies but in which in the plies locked to each bead, the cord angles are the same. Instead of varying the cord angle between each two adjacent plies, it is more economical to group the plies and have the angles in any group of two, four, or six, etc. plies the same. The cord angles may vary from one ply to the next, but it is more economical to use groups of a small number of plies (e.g. a group of two, four or six plies) in which all cord angles are the same. Such a group of plies with their ends locked to the same beads are referred to herein as a group unit. In the finished tire the cord angles will vary and there is a spread of several degrees, usually at least two degrees, and at times as many as five degrees or more between the plies in adjacent group units, depending upon the number of plies in each group unit and the bulk of the build up of ply material around each bead core, and in the finished multiple-bead tire built on a flat, low-profile drum there will be a difference of at least 10° between the cord angles of the inmost and outmost ply.

The invention will be further described in connection with the accompanying drawing, in which—

Figure 2:
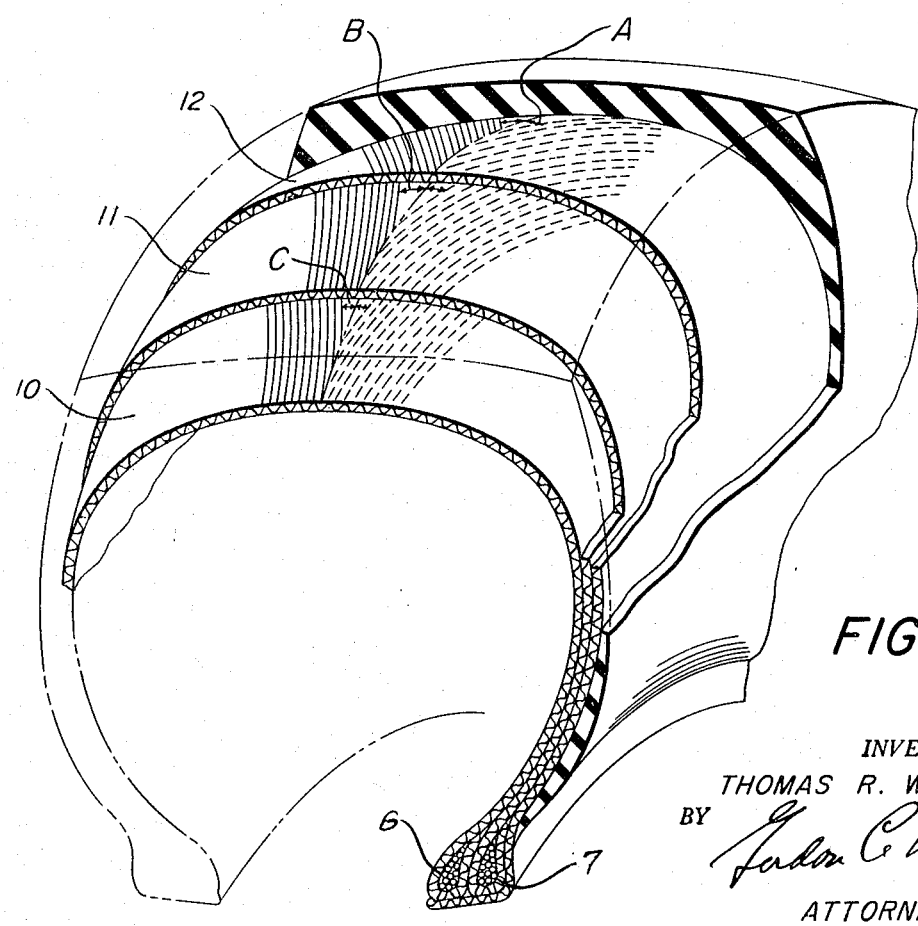

FIGURE 1 is a section through a flat, low-profile drum; the green plies on it being partly broken away in group units; and FIGURE 2 is a section through the cured tire partly broken away to show the several group units; it also shows the rubber covering.

In the drawings the several plies locked to each bead are shown as one group unit, and by showing the direction of the cords in at least one ply in full lines and the direction of the cords in another ply in dotted lines, a plurality of plies are indicated in which the cords are criss-crossed. The ends of the plies of the inner group unit are locked around the inner bead cores, the ends of the plies of the central group unit are locked around the outer bead cores, and the ends of the group unit of the outer plies are locked around both bead cores. Chafer strips, breaker strips, etc. may be added as desired, as well as linings to make the tire tubeless and to provide a puncture-proofness, etc.

In FIGURE 1 a flat, low-profile drum (i.e. a flat-band drum without undercut ends) is indicated by the numeral 5. The ends of the drum are not undercut because it is much simpler and easier to build up the succeeding plies of a tire carcass around drum edges which are not undercut, as explained.

The bead cores 6 and 7 are close to those portions of the several plies which lie on the outer surface of the drum and the fabric extends outwardly from the drum and encloses the bead cores without extending under the drum surface, thus avoiding the difficulties of stitching which such undercut drums necessitate. The group of inner plies, the group of central plies and the group of outer plies are each shown as one group unit (for the sake of clarity) and are designated by the numerals 10, 11 and 12. The cord angles in the plies of each group unit are the same. Thus, in the plies of the inner, central and outer group units the cord angles $a$, $b$ and $c$ are about 70°, 66° and 62°, respectively.

The ends of the inner plies are locked to the bead cores 6, the ends of the central plies are locked to the bead cores 7, and the ends of the outer plies are locked to both bead cores.

After building up the carcass and adding the rubber for the tread and side walls, the tire is expanded to its final shape and cured in the usual manner.

FIGURE 2 is a section of the tire after it has been expanded to its final shape and cured. During the expansion the various plies shift and the cord angles change. Thus when the tire has expanded to its final shape as shown in FIGURE 2 there is a difference of at least ten degrees between the average cord angle B of the central plies, and the average cord angles A and C of the outer and inner plies, respectively. This difference will vary, depending upon the number of plies in each group, the size of the cords and the size of the tire, but in the tire of this invention the difference in the cord angles of the inner and outer plies will be at least ten degrees due to the fact that the tire is made on a low-profile drum and the cord angles are varied so that the cords in all of the plies are under the same tension.

The cords in the plies in any one group may shift as a group or as individual cords. Thus in the finished tire made from the green carcass shown in FIGURE 1 and as described, the average cord angle of the plies of inner, central and outer group units is 55°, 45° and 35°, respectively. This wide difference in the angles of the cords of the different group units gives unusual rigidity and stability to the tire not inherent in tires of this size built on an undercut drum, which is the present customary practice.

The foregoing values relate to a twin-bead tire built on a flat, low-profile drum measuring substantially 22¼ inches in diameter. The inner diameter of the beads in the finished tire will be about 20 inches, for instance, and the tire will measure about 10 inches in cross section. Such a tire is known as a 10.00–20 size.

In a twin-bead tire with different cord angles than those described above in the various group units of the green tire, the cord angles in this finished tire may average about 45°, 35° and 25°, respectively, in the inner, central and outer plies. The average cord angles in the various group units might be 40°, 35° and 30° or 45°, 40° and 35°. Thus the invention is not limited with respect to the cord angles in the various plies but is limited with respect to the over-all spread of the cord angles in the inmost and outmost plies in order to obtain uniform cord tension.

The angle of the cords in the group of plies locked around a single bead core need not be the same. The angles of the cords may decrease by equal increments in each ply from the inner ply to the outer ply. However, this necessitates the manufacture and warehousing of an unnecessarily large number of different fabric cuttings. The angles in several adjacent plies may be the same. Whether the ends of these plies are locked around the same bead cores or different bead cores is immaterial except that the calculations and constructions are simplified by having plies in which the cord angles are the same, locked around the same bead cores. The plies may be applied to the drum separately or they may be banded together before being applied to the drum, as is well known in the art.

It is understood that the drawings are only illustrative. There may be any plural number of bead cores on each side of the tire and any number of plies in the tire. Many modifications in the construction shown are possible as will be understood by the man skilled in the art of tire construction.

The invention is covered in the claims which follow. What I claim is:

1. The method of building a multiple-bead tire on a flat, low-profile drum which extends substantially from the beads on one side of the tire to the beads on the opposite side of the tire using cord plies having different cord angles of less than 90° and criss-crossing the plies, which method comprises using first a ply of the greatest cord angle, with the cord angle of each succeeding ply no greater than that of the preceding ply, and using last a ply of the smallest cord angle, and extending the edges of the respective plies downwardly over the ends of the drum but not inwardly under the drum and then locking different bead cores in the edges of different plies which have been so extended; and then expanding the tire with pronounced shifting of the cord plies adjacent to the bead cores so that the angle between the cords and the centerline of the tire is increased until there is a spread of at least ten degrees between the angles of the cords in the first and last plies and until the cords of all the plies are under substantially the same tension, and then curing the tire.

2. The method of claim 1 in which at least six plies are built into the tire.

References Cited by the Examiner
UNITED STATES PATENTS

| | | | |
|---|---|---|---|
| 778,495 | 12/1904 | Marks | 152—356 |
| 790,907 | 5/1905 | Marks | 156—133 |
| 1,493,674 | 5/1924 | Hopkinson | 152—356 |
| 1,579,817 | 4/1926 | Keith | 152—356 |
| 2,432,630 | 12/1947 | Purdy | 152—356 |
| 2,700,998 | 2/1955 | Wallace | 156—133 |
| 2,703,128 | 3/1955 | Darrow | 156—133 |
| 3,057,391 | 10/1962 | Williams | 152—356 |

EARL M. BERGERT, *Primary Examiner.*

HAROLD ANSHER, *Examiner.*